United States Patent [19]

Uemiya et al.

[11] Patent Number: 5,291,568
[45] Date of Patent: Mar. 1, 1994

[54] OPTICAL WAVELENGTH CONVERSION MODULE

[75] Inventors: Takafumi Uemiya; Naota Uenishi, both of Osaka, Japan

[73] Assignee: Sumitomo Electric Industries, Ltd., Osaka, Japan

[21] Appl. No.: 994,353

[22] Filed: Dec. 21, 1992

[30] Foreign Application Priority Data

Dec. 20, 1991 [JP] Japan .................. 3-338181

[51] Int. Cl.$^5$ .................................... H01S 3/10
[52] U.S. Cl. .................... 385/31; 359/326; 372/21
[58] Field of Search .......... 385/31; 359/326; 372/21, 23, 32

[56] References Cited

U.S. PATENT DOCUMENTS 5,119,384  6/1992  Chikuma .................. 372/21
5,124,999  6/1992  Okazaki et al. .......... 372/21 X

FOREIGN PATENT DOCUMENTS 3-111826  5/1991  Japan.

OTHER PUBLICATIONS

"O plus E" Feb. 1984, pp. 89-97.

*Primary Examiner*—Akm E. Ullah
*Attorney, Agent, or Firm*—Cushman, Darby & Cushman

[57] ABSTRACT

An optical wavelength conversion module includes a semiconductor laser light source; a lens for focusing semiconductor laser light; and a fiber-type optical wavelength converter with a core and a clad having a refractive index lower than the core. At least one of the core and clad is formed of a non-linear optical material. The number of longitudinal modes of oscillation of the semiconductor laser light source is not less than three.

4 Claims, 1 Drawing Sheet

OPTICAL WAVELENGTH CONVERSION MODULE

BACKGROUND OF THE INVENTION

The present invention relates to an optical wavelength conversion module comprising a fiber-type optical wavelength converter in which a fundamental wave of semiconductor laser light is incident to a core, and a second harmonic thereof is emitted as converted light.

A non-linear optical effect is a phenomenon that when light is incident to a medium, there arises polarization proportional to higher order terms, quadratic and more, of an electric field of the light, and this phenomenon produces a second harmonic, a sum frequency, a difference frequency, and so on.

The material producing such a phenomenon is called a non-linear optical material, and as the material, inorganic materials such as $KH_2PO_4$, $LiNbO_3$, $LiTaO_3$, etc. have been well known. Recently, however, organic materials represented by 2- methyl-4-nitrileaniline (MNA), 4-dimethylamino-3-acetoamidonitrobenzene (DAN), and 3,5-dimethyl-1-(4-nitrophenyl)pyrazole (DMNP) has also attracted the attention because of their large non-linear optical constants.

Recently, studies for applying such a non-linear optical material to a fiber-type optical wavelength converter for halving the wavelength from a semiconductor laser light source using inter-band transition of a semiconductor are performed eagerly, and converters using $LiNbO_3$ or DMNP have been known.

In such a converter, in order to produce a second harmonic or the like with a high efficiency, it is important to design the converter to confine a fundamental wave with a high energy density, and ensure the interaction length between the fundamental wave and the higher harmonic. Therefore, either a core or a clad of an optical fiber is formed of single crystal or polycrystal of a non-linear optical material, and an amorphous material such as glass is used as either the clad or the core, so that a fundamental wave is guided into the core to thereby obtain a high conversion efficiency. FIG. 3 shows the state where a fundamental wave 6 having passed a core 41 of a fiber-type optical wavelength converter 4 is emitted after converted into a second harmonic 5.

In a fiber-type optical wavelength converter, it is also necessary to make the propagation rate of a fundamental wave coincident with that of a produced second harmonic, that is, to make phase matching between the fundamental wave and the second harmonic. The phase matching implicates that, as shown in FIG. 4, on the assumption that a second harmonic is produced at a point A from light propagating through the core 41 and leaks out to a clad 42 at an angle $\alpha$, in the case where the direction $\alpha$ at a point B after elaspe of a unit time is coincident to the equiphase plane of the first-mentioned second harmonic, a second harmonic is radiated (Cherenkov Radiation) in the direction of this angle $\alpha$. Let the refractive index of the clad 42 to a fundamental wave be $n_S(\omega)$, the refractive index of the core 41 be $n_C(\omega)$, and the refractive index of the clad 42 to a second harmonic be $n_S(2\omega)$, phase matching is made automatically to thereby make Cherenkov Radiation possible only if the following condition is satisfied.

$$n_S(2\omega) > n_C(\omega) > n_S(\omega)$$

For example, the investigation to use an optical wavelength conversion module comprising such a fiber-type optical wavelength converter for reading an optical disk is being advanced. To this end, an optical disk light source for generating a fundamental wave must be small, and therefore a semiconductor laser is employed.

In this case, noises of semiconductor laser light is amplified because the intensity of a second harmonic is proportional to the square of that of a fundamental wave, so that a high S/N ratio is required in the semiconductor laser light.

In the case of multi-longitudinal modes (spectra) of a semiconductor laser light, a sum frequency wave of two longitudinal modes is produced together with a second harmonic in a fiber-type optical wavelength converter, and the intensity of the sum frequency wave fluctuates as time goes. It has been therefore considered that it is preferable and necessary to use a single longitudinal mode of semiconductor laser oscillation in order to obtain light of narrow wavelength range.

If the number of longitudinal modes of semiconductor laser light is made one, however, when the above-mentioned semiconductor laser light is irradiated to a fiber-type optical wavelength converter, the semiconductor laser light source is badly affected by so-called "return" of light which is a phenomenon that the reflected light returns to the semiconductor laser light source. It is said that the effect appears not only in the case of strong reflected light fed back to a laser aperture, but also in the case of very weak one about $10^{-7}$ of light emitted from the semiconductor laser. The distance between the semiconductor laser light source and a reflection point for the effect to appear is in a wide range from a $\mu$m order to a km order ("O plus E", Feb. 1984, pp.89 to 97).

Mode jump is induced in the semiconductor laser by this return phenomenon, and many noise components are produced in output light. Consequently the S/N ratio of a second harmonic outputted from the fiber-type optical wavelength converter deteriorates.

SUMMARY OF THE INVENTION

It is therefore an object of the present invention to solve the foregoing technical problems, and to provide an optical wavelength conversion module which is hardly subjected to the effect of "return", and which is able to realize a superior S/N ratio.

In an optical wavelength conversion module of the present invention, the number of longitudinal modes of a semiconductor laser light is not smaller than three.

By making the number of longitudinal modes of a semiconductor laser not smaller than three, possible interference of semiconductor laser light is remarkably reduced, so that mode jump hardly occurs. Further, since all the modes do not jump even if mode jump occurs, noises caused by mode jump is reduced in comparison with those in a single-mode semiconductor laser.

Further, because of multi-longitudinal modes, not only second harmonics of respective modes but also a sum frequency wave of any two modes are mixed in the output from the fiber-type optical wavelength converter. Therefore, the intensity of the sum frequency wave fluctuates if the intensity of the modes fluctuate. By making the number of modes not smaller than three, however, it is possible to reduce the fluctuation in output ox the sum frequency wave and the second harmonic caused by the fluctuation of the respective modes.

DETAILED DESCRIPTION OF THE INVENTION

Preferred embodiments of the present invention will be described in detail with reference to the drawings.

Figure 1:
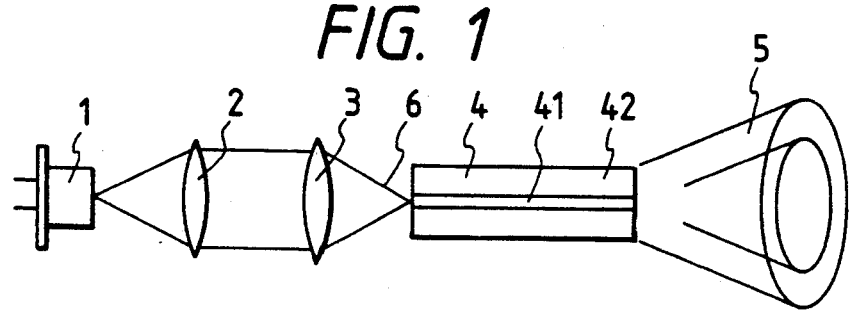
FIG. 1 is a conceptual diagram illustrating an example of the configuration of an optical wavelength conversion module using a fiber-type optical wavelength converter.

FIG. 1 is a conceptual diagram illustrating a basic configuration of an optical wavelength conversion module according to an embodiment of the present invention. In the optical wavelength conversion module, semiconductor laser light generated from a semiconductor laser light source 1 is collimated by a spherical lens 2, the collimated light is focused by a spherical lens 3, and the focused light is made incident to a fiber-type optical wavelength converter 4. In order to minimize the lens diameter, the aperture angle of the spherical lens 3 is designed so as to be substantially equal to that of the fiber-type optical wavelength converter 4.

The fiber-type optical wavelength converter 4 includes a core 41 and a clad 42.

A well-known non-linear optical material such as MNA, DAN, or the like, is applied to either one of or both of the core 41 and the clad 42.

If semiconductor laser light is incident to the core 41 of the fiber-type optical wavelength converter 4, Cherenkov Radiation of the semiconductor laser light as a fundamental wave is produced from the out-going end surface of the fiber-type optical wavelength converter 4, and a produced second harmonic (converted light) 5 is emitted so as to be radiated while being diffused in a ring shape. The emitted converted light is made to pass through a wavelength filter (not shown) for cutting off a fundamental wave, and collimated by a lens system (not shown) so as to be used for reading an optical disk.

Next, an example of producing a fiber-type optical wavelength converter will be described.

Experimental Example 1

A capillary tube of SF1 glass (made by HOYA GLASS CORP.) having an inner diameter of 1.6 μm, an outer diameter of 1.0 mm, and a length of 50 mm was filled with melted DAN, and then, the tube was cooled to grow up single crystal as a core to thereby prepare a fiber-type optical wavelength converter. The method of growing up the core was a method in which a crystal is grown up from an end by Bridgeman Method after the melted DAN is drawn up by use of a capillary tube phenomenon (with respect to the detail of the method, reference is made to Japanese Unexamined Patent Publication No. Hei-3-111826).

This fiber-type optical wavelength converter was cut out in the length of 10 mm so that its end surface was perpendicular to a light axis, and the optical wavelength converter was set so as to be in parallel to the light axis.

When semiconductor laser light (the number of longitudinal modes and the output being 10 and 100 mW respectively) of a wavelength 980 nm was incident to the core of the optical wavelength converter, the converted light of wavelength 490 nm was emitted from the fiber out-going end to the air.

When the relative intensity noise RIN (reference is made to "O plus E", Feb. 1984, pp. 95) of the obtained converted light which was expressed by $$RIN = \langle \Delta P^2 \rangle / P^2 \Delta f$$

was measured, the obtained value was $10^{-10}$, in which $\Delta f$ represents a unit frequency band width, $\langle \Delta P^1 \rangle$ represents a square average value of noise intensity in the unit frequency band width, and P represents light intensity of all frequency bands.

Next, a fiber-type optical wavelength converter was made up by use of DMNP in the same manner.

When semiconductor laser light (the number of longitudinal modes and the output being 10 and 100 mW respectively) of the wavelength 900 nm was incident to the core of this optical wavelength converter, the converted light of wavelength 450 nm was emitted from the out-going end of the fiber to the air.

When the relative intensity noise RIN of the obtained second harmonic was measured, the obtained value was $10^{-11}$.

Experimental Example 2

When semiconductor laser light (the output 100 mW) of a single mode was incident to the above-mentioned fiber-type optical wavelength converters using DAN and DMNP respectively, measured values of the relative intensity noise RIN of obtained converted lights were $10^{-8}$ and $10^{-9}$ respectively.

As is apparent from the above experimental examples, it is possible to reduce noises to a large extent in comparison with the case of a single mode by increasing the number of modes of semiconductor laser light.

Figure 2:
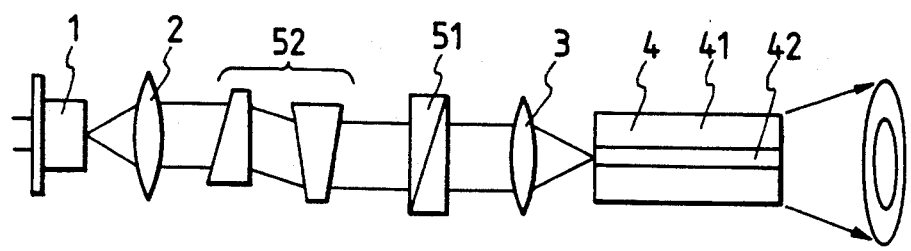
FIG. 2 is a conceptual diagram illustrating another example of the configuration of an optical wavelength conversion module using a fiber-type optical wavelength converter.
Figure 3:
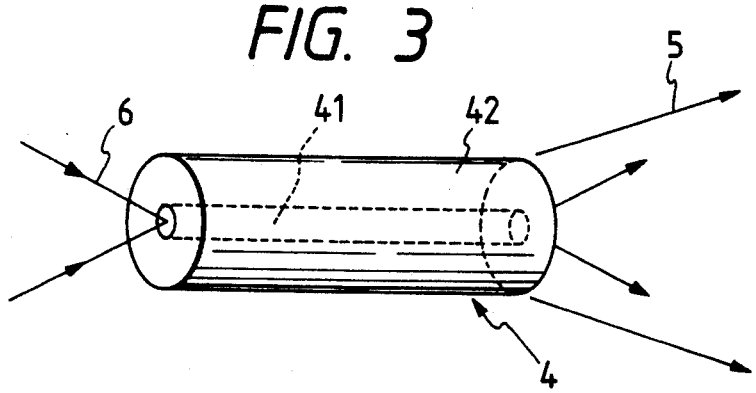
FIG. 3 is a diagram for explaining the operation principle of a fiber-type optical wavelength converter.
Figure 4:
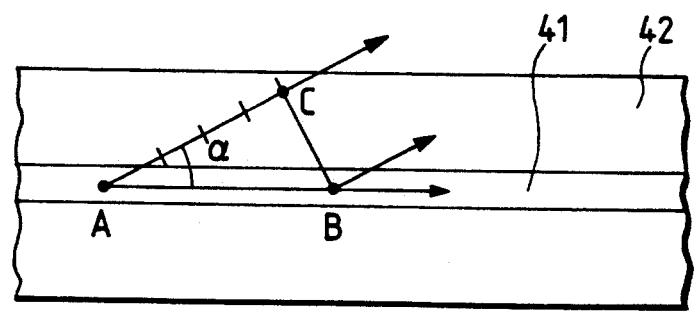
FIG. 4 is a diagram for explaining a Cherenkov radiation system.

The conventional technique of coating the end surface of a fiber-type optical wavelength converter with a reflection protection film may be combined with the above embodiment. Moreover as shown in FIG. 2, a ½ wavelength plate 51 may be inserted, or a prism beam expander 52 may be inserted for changing the beam cross-section of the semiconductor laser light source 1 from an ellipse to a circle. Further, various modifications of design may be provided within the scope of the present invention.

As has been described, according to the present invention, by making the number of longitudinal modes of a semiconductor laser not smaller than three, it is possible to realize an optical wavelength conversion module eliminating the effects of noises or output fluctuations and having a superior S/N ratio.

What is claimed is:

1. An optical wavelength conversion module, comprising:
   a semiconductor laser light source;
   a first lens for focusing semiconductor laser light; and
   a fiber-type optical wavelength converter including a core and a clad having a refractive index lower than said core, at least one of said core and clad being formed of a non-linear optical material, whereby said fiber-type optical wavelength converter produces light having converted wavelength from said semiconductor laser light incident to said core;

wherein the number of longitudinal modes of oscillation of said semiconductor laser light source is not less than three.

2. An optical wavelength conversion module as claimed in claim 1, wherein said first lens has an aperture angle equal to that of said fiber-type optical wavelength copnverter, said semiconductor laser light focused by said first lens being incident on said core of said fiber-type optical wavelength converter.

3. An optical wavelength conversion module as claimed in claim 1, further comprising a second lens for collimating said semiconductor laser light outputted from said semiconductor laser light source, said second lens being located between said semiconductor laser light source and said first lens.

4. An optical wavelength conversion module as calimed in claim 3, further comprising a prism beam expander for changing a cross-section of said semiconductor laser light collimated by said second lens, and a ½ wavelength plate, said beam expander being located between said first lens and said second lens, and said ½ wavelength plate being located between said beam expander and said first lens.

* * * * *